US008672142B2

(12) United States Patent
Nishiyama et al.

(10) Patent No.: US 8,672,142 B2
(45) Date of Patent: Mar. 18, 2014

(54) COMPOSITE SEMIPERMEABLE MEMBRANE

(75) Inventors: Shinya Nishiyama, Osaka (JP); Naoki Kurata, Osaka (JP); Takahisa Konishi, Osaka (JP); Yuuji Yamashiro, Osaka (JP); Kouji Maruyama, Osaka (JP); Yasuhiro Uda, Osaka (JP); Chiaki Harada, Osaka (JP)

(73) Assignee: Nitto Denko Corporation, Osaka (JP)

( * ) Notice: Subject to any disclaimer, the term of this patent is extended or adjusted under 35 U.S.C. 154(b) by 603 days.

(21) Appl. No.: 12/668,368

(22) PCT Filed: Jul. 11, 2008

(86) PCT No.: PCT/JP2008/062565
§ 371 (c)(1),
(2), (4) Date: Jan. 8, 2010

(87) PCT Pub. No.: WO2009/008500
PCT Pub. Date: Jan. 15, 2009

(65) Prior Publication Data
US 2010/0178489 A1    Jul. 15, 2010

(30) Foreign Application Priority Data
Jul. 12, 2007 (JP) .................. 2007-183450

(51) Int. Cl.
*B01D 39/20* (2006.01)
*B01D 61/00* (2006.01)
*C02F 1/28* (2006.01)

(52) U.S. Cl.
USPC .......... 210/500.25; 210/650; 210/500.21; 210/500.42; 210/500.38

(58) Field of Classification Search
None
See application file for complete search history.

(56) References Cited

U.S. PATENT DOCUMENTS

| | | | |
|---|---|---|---|
| 3,980,605 A | 9/1976 | Steigelmann et al. | |
| 5,015,268 A | 5/1991 | Ho | |
| 5,151,122 A | 9/1992 | Atsumi et al. | |
| 6,177,011 B1 | 1/2001 | Hachisuka et al. | |
| 6,413,425 B1 | 7/2002 | Hachisuka et al. | |
| 6,551,536 B1 | 4/2003 | Kwak et al. | |
| 6,652,751 B1 | 11/2003 | Kutowy et al. | |
| 2010/0320143 A1 | 12/2010 | Konishi et al. | |

FOREIGN PATENT DOCUMENTS

| | | |
|---|---|---|
| CN | 1213985 | 4/1999 |
| EP | 0099758 A2 | 2/1984 |
| EP | 2 172 259 | 4/2010 |
| GB | 2390042 A | 12/2003 |
| JP | 63-141609 | 6/1988 |
| JP | 3-218765 | 9/1991 |
| JP | 04-22410 | 1/1992 |
| JP | 5-115760 | 5/1993 |
| JP | 05-115760 A | 5/1993 |
| JP | 05-245349 | 9/1993 |
| JP | 07-039734 | 2/1995 |
| JP | 08-081318 A | 3/1996 |
| JP | 09-052031 | 2/1997 |
| JP | 11-221451 | * 2/1998 |
| JP | 10-337454 | 12/1998 |
| JP | 11-226367 | 8/1999 |
| JP | 2000-026220 | 1/2000 |
| JP | 2000-246074 | 9/2000 |
| JP | 2000-262873 | 9/2000 |
| JP | 2001-286741 | 10/2001 |
| JP | 2002-273417 | 9/2002 |
| JP | 2003-010656 | 1/2003 |
| JP | 2003-53163 A | 2/2003 |
| JP | 3379963 B2 | 2/2003 |
| JP | 2003-200026 | 7/2003 |
| JP | 2004-25102 | 1/2004 |
| JP | 2005-313079 | 11/2005 |
| JP | 2006-095517 | 4/2006 |
| JP | 2006-212512 | 8/2006 |
| JP | 2009-006279 | 1/2009 |
| WO | WO 00/00268 A1 | 1/2000 |
| WO | WO 2006/009341 A1 | 1/2006 |
| WO | WO 2006/098872 A2 | 9/2006 |
| WO | WO 2009/001916 | 12/2008 |

OTHER PUBLICATIONS

Tiller, "Silver-based antimicrobial coatings." Polymeric Drug Delivery II, ACS Symposium Series (2006) pp. 215-231.*
Machine translation of JP 11-221451, Feb. 1998.*
International Search Report (ISR) PCT/JP2008/062565, dated Jul. 25, 2008.
Notice of Preliminary Rejection mailed by Korean Intellectual Property Office on Nov. 30, 2011 in the corresponding Korean patent application No. 10-2010-7003154.

(Continued)

*Primary Examiner* — Katherine Zalasky
(74) *Attorney, Agent, or Firm* — Knobbe, Martens, Olson & Bear LLP

(57) ABSTRACT

It is an object of the present invention to provide a composite semipermeable membrane having an excellent resistance property to contamination, particularly an excellent resistance property to microbial contamination, and a water treatment method using the composite semipermeable membrane. The present invention relates to a composite semipermeable membrane comprising a skin layer formed on the surface of a porous support and containing a polyamide-based resin obtained by reacting a polyfunctional amine component with a polyfunctional acid halide component, wherein an antibacterial layer containing a silver-based antibacterial agent and a polymer component is formed on the skin layer directly or with other layer interposed therebetween, and the weight ratio between the silver-based antibacterial agent and the polymer component in the antibacterial layer is 55:45 to 95:5 (silver-based antibacterial agent:polymer component).

14 Claims, No Drawings

(56) References Cited

OTHER PUBLICATIONS

First Office Action issued by the State Intellectual Property Office of People's Republic of China on Mar. 13, 2012 in corresponding Chinese Patent Application No. 200880020970.0.
Silver nanoparticles immobilized on thin film composite, Polymers for Advanced Technologies, 18: 562-568 (2007).
Preparation of antimicrobial poly electrospun nanofibers containing silver-loaded zirconium phosphate nanoparticles, Journal of Applied Polymer Science, 106: 1208-1214 (2007).
Search and Examination Report issued by the Intellectual Property Office of Singapore dated Jun. 4, 2011 for the counterpart Singapore Patent Application No. 201000153-5.
Ben Hamouda et al., May 31, 2007, Polyamide 12-polytetramethyleneoxide block copolymer membranes with silver nanoparticles-synthesis and water permeation properties, Reactive and Functional Polymers, 67(1):893-904.
Miranda et al., 2001, Ultraviolet-induced crosslinking of poly(vinyl alcohol) evaluated by principal component analysis of FTIR spectra, Polymer International, 50:1068-1072.
Zidan, 1999, Effect of $AgNO_3$ filling and UV-irradiation on the structure and morphology of PVA films, Polymer Testing, 18:449-461.
Extended European Search Report issued in corresponding patent application No. 08778080.5, dated Jun. 26, 2012.
Yamamoto et al., Features and applications of silver-based inorganic antimicrobial agent 'Novaron,' Toagosei Research Annual Report, TREND, Japan, Jan. 1, 1998, first issue, pp. 28-33; http://www2.toagosei.co.jp/develop/trend/index.html.
Notification of Reasons for Refusal dated Dec. 7, 2012 in corresponding Japanese patent application No. 2008-180379.
Second Office Action dated Jan. 14, 2013 in corresponding Chinese patent application No. 200880020970.0.
Lu et al., May 9, 2007, In situ formation of Ag nanoparticles in spherical polyacrylic acid brushes by UV irradiation, J. Phys. Chem. C, pp. A-F.
Notice of Allowance mailed by Korean Intellectual Property Office on Jul. 30, 2012 in the corresponding Korean patent application No. 10-2010-7003154.
Yamamoto et al., Jan. 1, 1998, Characteristics and application of silver-based inorganic antimicrobial agent, 'Novaron,' TOAGOSEI Research Annual Report, TREND, Japan, 1:28-33.
Notification of Reasons for Refusal dated Jul. 30, 2013 in corresponding Japanese patent application No. 2008-180379.
Rejection Decision dated Nov. 10, 2013 in corresponding Chinese patent application No. 200880020970.0.
Decision of Refusal dated Nov. 12, 2013 in corresponding Japanese patent application No. 2008-180379.

* cited by examiner

COMPOSITE SEMIPERMEABLE MEMBRANE

This application is the U.S. National Phase under 35 U.S.C. §371 of International Application PCT/JP2008/062565, filed Jul. 11, 2008, which claims priority to Japanese Patent Application No. 2007-183450, filed Jul. 12, 2007. The International Application was published under PCT Article 21(2) in a language other than English.

FIELD OF THE INVENTION

The present invention relates to a composite semipermeable membrane having a skin layer which includes a polyamide resin and a porous support that supports the skin layer, and a water treatment method using the composite semipermeable membrane. The composite semipermeable membranes are suitably used for production of ultrapure water, desalination of brackish water or sea water, etc., and usable for removing or collecting pollution sources or effective substances from pollution, which causes environment pollution occurrence, such as dyeing drainage and electrodeposition paint drainage, leading to contribute to closed system for drainage. Furthermore, the membrane can be used for concentration of active ingredients in foodstuffs usage, for an advanced water treatment, such as removal of harmful component in water purification and sewage usage etc.

DESCRIPTION OF THE RELATED ART

In water treatment steps using composite semipermeable membranes, fouling, that is, phenomena of degradation in water permeability, such as an amount of water permeation and salt-blocking rate may occur with progress of time. Accordingly, most costs in management costs of water treatment facilities are consumed for loss disposition that is caused by the fouling, and for fouling prevention. For this reason, fundamental preventive measures to such fouling have been demanded.

Causative substances that give the fouling may be classified into inorganic crystalline foulings, organic foulings, particles and colloidal foulings, and microbial foulings, based on the nature thereof. In the case of polyamide composite semipermeable membranes, the microbial fouling is the main causative substance, which is caused by formation of thin bio films that are formed with absorption of microbes, existing in water, to the surface of a separation membrane.

In order to reduce the fouling, methods such as pretreatment of raw water, modification of electrical property on the surface of a separation membrane, improvement of a module step condition, and periodic cleaning have been widely used. In the case of foulings by microbes that are most frequently generated especially in composite semipermeable membranes, it is known that a treatment using disinfectants such as chlorine will significantly decrease the microbial fouling. However, since chlorine generates by-products such as carcinogenic substances, application to a step for producing drinking water as it is may cause many problems.

Most recent investigations on antifouling separation membranes generally focus on modification of the electric charge property of a surface. For example, a method of forming a surface layer containing a cross-linked organic polymer that has a nonionic hydrophilic group on a reverse osmosis composite membrane is proposed (Patent Document 1). A method of carrying out hydrophilic coating on a polyamide thin film using a non water-soluble high polymer obtained by cross linking of an epoxy compound is proposed (Patent Document 2). A reverse osmosis separation membrane having a nano structure is proposed, the membrane having a structure with nano particles $TiO_2$ incorporated on the surface of the separation membrane (Patent Document 3). Furthermore, a method of blending nano particles in a separation active layer, or a method of providing a hydrophilic layer containing nano particles on a separation active layer is proposed (Patent Document 4).

However, the method of Patent Document 1 only modifies the surface into electrically neutral state, and therefore, the surface does not have functions of disinfection or suppression of increase against bacteria, once the bacteria attach to the surface. Accordingly, the surface has a low effect for suppressing degradation of membrane characteristics caused by organism-originated contamination or secondary contamination resulting therefrom.

In the method of Patent Document 2, there is no function for disinfection or suppression of increase against the attached bacteria, and for this reason, an effect to organism-originated contamination is low.

The method of Patent Document 3 uses a nano-sized photo catalyst, however, unless the photo catalyst is irradiated with light, the photo catalyst does not exert function for decomposing organic substances. Therefore, since light does not reach the inside of spiral elements processed for use in actual water treatment steps of reverse osmosis separation membranes, and of pressure-resistant vessels for storing the spiral elements in a water treatment equipment, the catalyst cannot exhibit the catalytic activity. Accordingly, since the catalyst cannot decompose attached materials on the surface of the membrane, an effect against contamination is low.

In the method of Patent Document 4, the separation active layer requires extremely advanced denseness in a molecular level, however, film formation under mixed state of nano particles impairs the denseness of the separation active layer, and significant degradation of membrane performance will be predicted. In addition, dispersing agents etc. are added for suppressing aggregation of nano particles, and the higher concentration of nano particles for maintenance of antibacterial durability causes aggregation easily, leading to difficulty of forming a uniform separation active layer or a hydrophilic layer.

Patent Document 1: Japanese Patent Application Laid-Open No. 11-226367
Patent Document 2: Japanese Patent Application Laid-Open No. 2004-25102
Patent Document 3: Japanese Patent Application Laid-Open No. 2003-53163
Patent Document 4: International Publication No. WO 06/098872 Pamphlet

DISCLOSURE OF THE INVENTION

Problems to be Solved by the Invention

It is an object of the present invention to provide a composite semipermeable membrane having an excellent resistance property to contamination, particularly an excellent resistance property to microbial contamination, and a water treatment method using the composite semipermeable membrane.

Means For Solving The Problems

In view of the existing circumstances as described above, the present inventors made intensive studies and found that the following composite semipermeable membrane can be used to solve the problems described above.

That is, the present invention relates to a composite semipermeable membrane comprising a skin layer formed on the surface of a porous support and containing a polyamide-based resin obtained by reacting a polyfunctional amine component with a polyfunctional acid halide component, wherein an antibacterial layer containing a silver-based antibacterial agent and a polymer component is formed on the skin layer directly or with other layer interposed therebetween, and the weight ratio between the silver-based antibacterial agent and the polymer component in the antibacterial layer is 55:45 to 95:5 (silver-based antibacterial agent:polymer component).

The composite semipermeable membrane of the present invention has an antibacterial layer including a silver-based antibacterial agent and a polymer component, and can maintain a resistance property to microbial contamination for a long term by the antibacterial layer. In particular, an excellent resistance property to microbial contamination can be exerted by adjusting the weight ratio between the silver-based antibacterial agent and the polymer component in the antibacterial layer to 55:45 to 95:5 (silver-based antibacterial agent: polymer component), and adding the silver-based antibacterial agent excessively relative to the polymer component so that a part of the silver-based antibacterial agent can be exposed onto the surface of the antibacterial layer. If the weight ratio of the silver-based antibacterial agent is less than 55, such a resistance property to microbial contamination is not sufficiently exerted because it becomes difficult to expose the silver-based antibacterial agent onto the surface of the antibacterial layer. On the other hand, if the weight ratio of the silver-based antibacterial agent exceeds 95, the resistance property to microbial contamination cannot be maintained for a long term because the silver-based antibacterial agent exposed onto the surface of the antibacterial layer becomes easy to drop out/flow out during the water treatment step. Moreover, since in the present invention the antibacterial layer is formed on the skin layer directly or with other layer interposed therebetween and the antibacterial agent is not dispersed in the skin layer, denseness of the skin layer is maintained. As a result, reduction in the performance of the skin layer can be prevented, and not only the resistance property to contamination but also water permeation performance as well as salt-blocking rate can be maintained high.

In the present invention, the silver-based antibacterial agent can be preferably a supported material containing a silver ion. Since the supported material containing a silver ion carries a silver ion in a densely dispersed state, it is possible to enlarge the total surface area of the silver per unit area of the antibacterial layer when the antibacterial layer is formed using the supported material. As a result, the contact area of the silver with the processed water becomes large to exert an excellent resistance property to microbial contamination.

It is preferable that the silver-based antibacterial agent has an average particle diameter of 1.5 μm or less. If the average particle diameter of the silver-based antibacterial agent exceeds 1.5 μm, the composite semipermeable membrane performance tends to fall by physical damages such as friction in a case where the composite semipermeable membrane is wound as a spiral element.

The silver-based antibacterial agent is preferably heat-treated at 700° C. or higher. By using the silver-based antibacterial agent that is heat-treated at 700° C. or higher, retention of the silver component contained in the silver-based antibacterial agent can be improved at the time of water supply.

The silver content in the antibacterial layer is preferably 30 mg/m$^2$ or more. As a result, an excellent antibacterial property can be maintained for a long term.

The polymer component is preferably polyvinyl alcohol which dissolves neither the skin layer nor the porous support, and is not eluted at the time of water treatment operation.

The polyvinyl alcohol has preferably a saponification degree of 99% or more. The polyvinyl alcohol with the saponification degree of 99% or more can dissolve in hot water (around 80° C.), but cannot dissolve in water of around a normal temperature (around 25° C.) due to the influence of the hydrogen bonding between the molecular chains, and even if its crosslinking degree is low, the polyvinyl alcohol is preferable because its solubility in an aqueous solution becomes lower. In addition, since the polyvinyl alcohol can impart a lot of hydroxyl groups to the surface of the antibacterial layer, it is also desirable from the viewpoint of not only improved resistance to contaminated materials but also enhanced hydrophilicity (enhancement of water permeation performance) of the composite semipermeable membrane.

In addition, water-insolubility of the antibacterial layer at the time of water treatment operation may be realized by using polyvinyl alcohol having a saponification degree of 90% or more and crosslinking the polyvinyl alcohol to the polyamide-based resin of the skin layer.

Moreover, the present invention relates to a water treatment method using the above composite semipermeable membrane. Since occurrence of microbial fouling can be prevented for a long term by using the composite semipermeable membrane of the present invention, operating costs in the water treatment facility can be reduced and productivity can be improved.

BEST MODE FOR CARRYING OUT THE INVENTION

Hereinafter, embodiments of the present invention will be described. In the composite semipermeable membrane of the present invention, a skin layer containing a polyamide-based resin obtained by reacting a polyfunctional amine component with a polyfunctional acid halide component is formed on the surface of a porous support, and an antibacterial layer is further formed on the skin layer directly or with other layer interposed therebetween.

The polyfunctional amine component is defined as a polyfunctional amine having two or more reactive amino groups, and includes aromatic, aliphatic, and alicyclic polyfunctional amines.

The aromatic polyfunctional amines include, for example, m-phenylenediamine, p-phenylenediamine, o-phenylenediamine, 1,3,5-triamino benzene, 1,2,4-triamino benzene, 3,5-diaminobenzoic acid, 2,4-diaminotoluene, 2,6-diaminotoluene, N,N'-dimethyl-m-phenylenediamine, 2,4-diaminoanisole, amidol, xylylene diamine etc.

The aliphatic polyfunctional amines include, for example, ethylenediamine, propylenediamine, tris(2-aminoethyl) amine, n-phenylethylenediamine, etc.

The alicyclic polyfunctional amines include, for example, 1,3-diaminocyclohexane, 1,2-diaminocyclohexane, 1,4-diaminocyclohexane, piperazine, 2,5-dimethylpiperazine, 4-aminomethyl piperazine, etc.

These polyfunctional amines may be used independently, and two or more kinds may be used in combination. In order to obtain a skin layer having a higher salt-blocking property, it is preferred to use the aromatic polyfunctional amines.

The polyfunctional acid halide component represents polyfunctional acid halides having two or more reactive carbonyl groups.

The polyfunctional acid halides include aromatic, aliphatic, and alicyclic polyfunctional acid halides.

The aromatic polyfunctional acid halides include, for example trimesic acid trichloride, terephthalic acid dichloride, isophthalic acid dichloride, biphenyl dicarboxylic acid dichloride, naphthalene dicarboxylic acid dichloride, benzenetrisulfonic acid trichloride, benzenedisulfonic acid dichloride, chlorosulfonyl benzenedicarboxylic acid dichloride etc.

The aliphatic polyfunctional acid halides include, for example, propanedicarboxylic acid dichloride, butane dicarboxylic acid dichloride, pentanedicarboxylic acid dichloride, propane tricarboxylic acid trichloride, butane tricarboxylic acid trichloride, pentane tricarboxylic acid trichloride, glutaryl halide, adipoyl halide etc.

The alicyclic polyfunctional acid halides include, for example, cyclopropane tricarboxylic acid trichloride, cyclobutanetetracarboxylic acid tetrachloride, cyclopentane tricarboxylic acid trichloride, cyclopentanetetracarboxylic acid tetrachloride, cyclohexanetricarboxylic acid trichloride, tetrahydrofurantetracarboxylic acid tetrachloride, cyclopentanedicarboxylic acid dichloride, cyclobutanedicarboxylic acid dichloride, cyclohexanedicarboxylic acid dichloride, tetrahydrofuran dicarboxylic acid dichloride, etc.

These polyfunctional acid halides may be used independently, and two or more kinds may be used in combination. In order to obtain a skin layer having higher salt-blocking property, it is preferred to use aromatic polyfunctional acid halides. In addition, it is preferred to form a cross linked structure using polyfunctional acid halides having trivalency or more as at least a part of the polyfunctional acid halide components.

Furthermore, in order to improve performance of the skin layer including the polyamide resin, polymers such as polyvinyl alcohol, polyvinylpyrrolidone, and polyacrylic acids etc., and polyhydric alcohols, such as sorbitol and glycerin may be copolymerized.

The porous support for supporting the skin layer is not especially limited as long as it has a function for supporting the skin layer, and usually ultrafiltration membrane having micro pores with an average pore size approximately 10 to 500 angstroms may preferably be used. Materials for formation of the porous support include various materials, for example, polyarylether sulfones, such as polysulfones and polyether sulfones; polyimides; polyvinylidene fluorides; etc., and polysulfones and polyarylether sulfones are especially preferably used from a viewpoint of chemical, mechanical, and thermal stability. The thickness of this porous support is usually approximately 25 to 125 μm, and preferably approximately 40 to 75 μm, but the thickness is not necessarily limited to them. The porous support is reinforced with backing by cloths, nonwoven fabric, etc.

Processes for forming the skin layer including the polyamide resin on the surface of the porous support is not in particular limited, and any publicly known methods may be used. For example, the publicly known methods include an interfacial condensation method, a phase separation method, a thin film application method, etc. The interfacial condensation method is a method, wherein an amine aqueous solution containing a polyfunctional amine component, an organic solution containing a polyfunctional acid halide component are forced to contact together to form a skin layer by an interfacial polymerization, and then the obtained skin layer is laid on a porous support, and a method wherein a skin layer of a polyamide resin is directly formed on a porous support by the above-described interfacial polymerization on a porous support. Details, such as conditions of the interfacial condensation method, are described in Japanese Patent Application Laid-Open No. 58-24303, Japanese Patent Application Laid-Open No. 01-180208, and these known methods are suitably employable.

The thickness of the skin layer formed on the porous support is not in particular limited, and it is usually approximately 0.05 to 2 μm, and preferably 0.1 to 1 μm.

After having formed the skin layer on the surface of the porous support, an antibacterial layer containing a silver-based antibacterial agent and a polymer component is formed on the skin layer directly or with other layer interposed therebetween. As for the weight ratio between the silver-based antibacterial agent and the polymer component in the antibacterial layer, 55:45 to 95:5 (silver-based antibacterial agent:polymer component), preferably 60:40 to 90:10 is required.

The silver-based antibacterial agent used in the present invention is not particularly limited so long as it is a compound containing a silver component, and includes, for example, metal silver, silver oxide, silver halide and a supported material containing a silver ion. Among these, it is particularly preferable to use a supported material containing a silver ion. Examples of the supported material include zeolite, silica gel, calcium phosphate, and zirconium phosphate. Among these, zirconium phosphate is preferably used. Zirconium phosphate has stronger hydrophobicity than that of other supported materials, and can maintain the antibacterial effect of the silver ion at the time of water treatment operation for a long term. The supported material preferably has a porous structure. Since the supported material having a porous structure can retain a silver component in its inside, not only the content of the silver component can be increased, but also the maintaining performance (retention performance) of the silver component is improved.

The average particle diameter of the silver-based antibacterial agent is preferably 1.5 μm or less, and more preferably 1 μm or less. In addition, measurement of the average particle diameter is performed according to the description of example.

The silver-based antibacterial agent is preferably heat-treated at 700° C. or higher. By using the silver-based antibacterial agent that is heat-treated at 700° C. or higher, retention property of the silver component contained in the silver-based antibacterial agent can be improved at the time of water supply. Concretely, by using the silver-based antibacterial agent, it is possible to adjust the silver content in the antibacterial layer to 50% or more after supplying raw water with an accumulated amount of water permeation of about 13 m$^3$/m$^2$, relative to the content prior to water supply, and it is even possible to adjust the content to 90% or more, depending on a heat-treatment temperature. The heat-treatment temperature is preferably 900° C. or higher, and especially preferably 1000° C. or higher. The upper limit for the heat treatment temperature is not particularly limited and it is usually around 1300° C., if it is a temperature at which the silver-based antibacterial agent can retain its antibacterial property and particles are not thermally decomposed so that the silver-based antibacterial agent is uniformly dispersed.

As for the polymer component, it is not particularly limited if it dissolves neither the skin layer nor the porous support, and is not eluted at the time of water treatment operation. Examples of the polymer component include polyvinyl alcohol, polyvinyl pyrrole, polyvinylpyrrolidone, hydroxypropylcellulose, polyethylene glycol, and saponified polyethylene-vinyl acetate copolymer, etc. Among these, polyvinyl alcohol is preferably used, and especially polyvinyl alcohol having a saponification degree of 99% or more is preferably used.

Elution of the polyvinyl alcohol in the water treatment operation may be prevented by using polyvinyl alcohol having a saponification degree of 90% or more and crosslinking the polyvinyl alcohol to the polyamide-based resin of the skin layer. Examples of a method for crosslinking polyvinyl alcohol include methods of forming an antibacterial layer on a skin layer and then immersing the antibacterial layer in a polyvalent aldehyde solution acidified with hydrochloric acid. Examples of the polyvalent aldehyde include dialdehydes such as glutaraldehyde and terephthalaldehyde. Organic crosslinking agents such as epoxy compounds and polycarboxylic acids and inorganic crosslinking agents such as boron compounds may be employed as the crosslinking agent.

The antibacterial layer is formed by coating an aqueous solution containing the silver-based antibacterial agent and the polymer component onto the skin layer directly or with other layer (for example, a protective layer containing a hydrophilic resin) interposed therebetween and drying the solution afterwards. Examples of the coating method include spraying, coating, and showering, etc. As the solvent, in addition to water, organic solvents that do not deteriorate the performance of the skin layer, etc. may be used in combination. Examples of such organic solvents include aliphatic alcohols such as methanol, ethanol, propanol and butanol; and lower alcohols such as methoxymethanol and methoxyethanol.

The concentration of the silver-based antibacterial agent in the aqueous solution is preferably 0.1 to 10% by weight, more preferably 0.5 to 5% by weight. In addition, the concentration of the polymer component in the aqueous solution is preferably 0.01 to 1% by weight, more preferably 0.1 to 0.7% by weight.

The temperature of the aqueous solution is not particularly limited as long as it is in a temperature range at which the aqueous solution exists as a liquid, and the temperature is preferably 10 to 90° C., more preferably 10 to 60° C., and especially preferably 10 to 45° C., in view of preventing the deterioration of the skin layer and easiness of handling, etc.

The temperature when dry processing is performed is not particularly limited, and it is preferably 20 to 150° C., more preferably 40 to 130° C. If the temperature is less than 20° C., dry processing takes too much time, or drying becomes insufficient, and if the temperature exceeds 150° C., membrane performance tends to fall by changing of the membrane structure due to heat.

The thickness of the antibacterial layer is not particularly limited, and it is usually 0.05 to 5 µm, preferably 0.1 to 3 µm, and more preferably 0.1 to 2 µm. If the thickness of the antibacterial layer is too thin, the antibacterial property is not sufficiently exhibited and salt-blocking rate might decrease because the membrane is easy to be damaged by rubbing when a spiral element is wound. On the other hand, if the thickness of the antibacterial layer is too thick, water permeation flux might fall below the range of practical use.

The silver content in the antibacterial layer is preferably 30 mg/m$^2$ or more, and more preferably 35 mg/m$^2$ or more. If the silver content is less than 30 mg/m$^2$, it becomes difficult to maintain an excellent antibacterial property for a long term. In addition, from a viewpoint of cost and prevention of membrane damage, the silver content in the antibacterial layer is preferably 1000 mg/m$^2$ or less, and more preferably 500 mg/m$^2$ or less. Measurement of the silver content in the antibacterial layer is performed according to the description in examples.

Furthermore, in order to improve salt-blocking property, water permeability, anti-oxidizing agent property, etc. of the composite semipermeable membrane, various publicly known conventional treatments may be applied to the film.

The composite semipermeable membrane of the present invention is used suitably for known water treatment methods such as production of ultrapure water, desalination of brackish water or seawater and wastewater treatment.

EXAMPLE

The present invention will, hereinafter, be described with reference to Examples, but the present invention is not limited at all by these Examples.
[Evaluation and Measuring Method]
(Measurement of Average Particle Diameter)

The average particle diameter of a silver-based antibacterial agent was measured on volume basis by laser diffractometry using a laser diffraction particle size analyzer.
(Measurement of Silver Content in Antibacterial Layer)

The produced composite semipermeable membrane was cut out into a size of 6 mmφ to obtain a sample. The sample was placed in a container, and 4 mL of concentrated nitric acid and 1 mL of hydrofluoric acid were added thereto, and then the container was sealed. Subsequently, the container was subjected to microwave irradiation and heated under the conditions such that the surface of the container becomes a maximum temperature of 230° C. to perform pressure acid decomposition. After the decomposition, ultrapure water was added to the container to obtain 50 ml of an aqueous solution. After that, the silver content in the aqueous solution was measured using an inductive coupling plasma mass spectrometry device (ICP-MS) thereby to determine the silver content (mg) in 1 m$^2$ of an antibacterial layer.
(Measurement of Permeation Flux and Salt-Blocking Rate)

The produced composite semipermeable membrane with a shape of a flat film is cut into a predetermined shape and size, and is set to a cell for flat film evaluation. An aqueous solution containing NaCl of about 1500 mg/L and adjusted to a pH of 6.5 to 7.5 with NaOH was forced to contact to a supply side, and a permeation side of the membrane at a differential pressure of 1.5 Mpa at 25° C. A permeation velocity and an electric conductivity of the permeated water obtained by this operation were measured for, and a permeation flux (m$^3$/m$^2$·d) and a salt-blocking rate (%) were calculated. The correlation (calibration curve) of the NaCl concentration and the electric conductivity of the aqueous solution was beforehand made, and the salt-blocking rate was calculated by a following equation. In addition, the composite semipermeable membrane produced in the form of a flat film was processed into a spiral shape to make a spiral element, and its permeation flux (m$^3$/m$^2$·d) and salt-blocking rate (%) were calculated in the same manner as above.

Salt-blocking rate(%)={1−(NaCl concentration[mg/L] in permeated liquid)/(NaCl concentration[mg/L] in supply solution)}×100

(Evaluation of Antibacterial Property)

An antibacterial property was evaluated according to JIS Z2801:2000. Outline of the test is shown as follows. *Escherichia coli* was shaken and cultured in a normal bouillon medium (NB) at 35° C. and then the grown *Escherichia coli* was diluted with 1/500 NB to prepare 2.5 to $10\times10^5$ cfu/ml of an *Escherichia coli* solution. This *Escherichia coli* solution was added dropwise onto an ultra-low pressure reverse osmosis composite membrane (manufactured by Nitto Denko Corporation; Type: ES20, without antibacterial layer) and the produced composite semipermeable membrane, and after the film was covered, culturing was performed at 35° C. for 24 hours. After that, the *Escherichia coli* solution was collected from the ultra-low pressure reverse osmosis composite membrane and the composite semipermeable membrane to measure the viable bacterial cell count respectively. The viable bacterial cell count was counted with Petrifilm for *Escherichia coli* measurement (manufactured by 3M Corporation).

A case where (viable bacterial cell count in ultra-low pressure reverse osmosis composite membrane)/(viable bacterial cell count in composite semipermeable membrane) is $1\times10^4$ or more was ranked as "○" (excellent in antibacterial activity), and the case of $1\times10^2$ or less was ranked as "x" (no antibacterial activity).

Example 1

An aqueous solution containing 0.7% by weight of a silver-based antibacterial agent with an average particle diameter of 0.9 μm (manufactured by Toagosei Co., Ltd., NOVARON AG1100) and 0.5% by weight of polyvinyl alcohol (saponification degree: 99%) was applied onto the skin layer of an ultra-low pressure reverse osmosis composite membrane (manufactured by Nitto Denko Corporation, Type: ES20, skin layer: polyamide-based resin, performance: permeation flux 1.2 ($m^3/m^2 \cdot d$) and salt-blocking rate 99.6(%) as measured by the above measuring method), and subsequently dried in an oven at 130° C. for 3 minutes to form an antibacterial layer, thereby producing a composite semipermeable membrane.

Example 2

A composite semipermeable membrane was produced in the same manner as in Example 1, except that 0.7% by weight of the silver-based antibacterial agent was changed to 2% by weight.

Example 3

A composite semipermeable membrane was produced in the same manner as in Example 1, except that 0.7% by weight of the silver-based antibacterial agent was changed to 5% by weight.

Example 4

An aqueous solution (isopropanol:water=3:7) containing 2% by weight of a silver-based antibacterial agent with an average particle diameter of 0.9 μm (manufactured by Toagosei Co., Ltd., NOVARON AG1100) and 0.5% by weight of polyvinyl alcohol (saponification degree: 90%) was applied onto the skin layer of an ultra-low pressure reverse osmosis composite membrane (manufactured by Nitto Denko Corporation, Type: ES20), and subsequently dried in an oven at 130° C. for 3 minutes to form an antibacterial layer. After that, the resulting composite membrane was immersed in an aqueous solution containing 0.001% by weight of glutaraldehyde acidified with 0.24N hydrochloric acid for 10 seconds, and dried again at 130° C. for 5 minutes to produce a composite semipermeable membrane.

Example 5

A composite semipermeable membrane was produced in the same manner as in Example 1, except that 0.7% by weight of the silver-based antibacterial agent was changed to 2% by weight, and 0.5% by weight of the polyvinyl alcohol was changed to 0.2% by weight.

Example 6

A composite semipermeable membrane was produced in the same manner as in Example 5, except that a silver-based antibacterial agent (manufactured by Toagosei Co., Ltd., NOVARON AG1100) which had been heat-treated at 800° C. was used. After that, the produced composite semipermeable membrane was set in a metallic cell, and operation was performed under the conditions of a membrane permeation flux of 1.22 ($m^3/m^2 \cdot d$) and a linear velocity of 0.33 ($m^3/m^2 \cdot second$) for 11 days, using RO water of 30° C. as raw water. Subsequently, the composite semipermeable membrane was taken out and the silver content in the antibacterial layer was measured in the same manner as above. The results are shown in Table 2.

Example 7

A composite semipermeable membrane was produced in the same manner as in Example 5, except that a silver-based antibacterial agent (manufactured by Toagosei Co., Ltd., NOVARON AG1100) which had been heat-treated at 1000° C. was used. After that, the silver content in the antibacterial layer was measured in the same manner as in Example 6. The results are shown in Table 2.

Example 8

A composite semipermeable membrane was produced in the same manner as in Example 5, except that a silver-based antibacterial agent (manufactured by Toagosei Co., Ltd., NOVARON AG1100) which had been heat-treated at 1200° C. was used. After that, the silver content in the antibacterial layer was measured in the same manner as in Example 6. The results are shown in Table 2.

Comparative Example 1

An aqueous solution containing 0.25% by weight of polyvinyl alcohol (saponification degree: 99%) was applied to the skin layer of an ultra-low pressure reverse osmosis composite membrane (manufactured by Nitto Denko Corporation, Type: ES20), and then dried in an oven at 130° C. for 3 minutes to form a polymer layer thereby to produce a composite semipermeable membrane.

Comparative Example 2

A composite semipermeable membrane was produced in the same manner as in Example 1, except that 0.7% by weight of the silver-based antibacterial agent was changed to 0.04% by weight.

TABLE 1

| | Silver-based antibacterial agent/polymer component (Weight ratio) | Silver content (mg/m²) | Flat film shape | | Spiral shape | | Antibacterial property |
|---|---|---|---|---|---|---|---|
| | | | Salt-blocking rate (%) | Permeation flux (m³/m²·d) | Salt-rejection rate (%) | Permeation flux (m³/m²·d) | |
| Example 1 | 58.3/41.7 | 40 | 99.6 | 0.5 | 99.6 | 0.5 | ○ |
| Example 2 | 80/20 | 130 | 99.7 | 0.6 | 99.7 | 0.5 | ○ |
| Example 3 | 91/9 | 320 | 99.6 | 0.8 | 99.6 | 0.8 | ○ |
| Example 4 | 80/20 | 120 | 99.6 | 0.8 | 99.6 | 0.9 | ○ |
| Example 5 | 91/9 | 130 | 99.6 | 0.8 | 99.6 | 0.8 | ○ |
| Comparative Example 1 | — | — | 99.7 | 0.8 | 99.7 | 0.8 | X |
| Comparative Example 2 | 7/93 | 2.6 | 99.6 | 0.7 | 99.6 | 0.7 | X |

TABLE 2

| | Silver-based antibacterial agent/polymer component (Weight ratio) | Silver content | | Silver retention rate (%) | Flat film shape | | Spiral shape | | Antibacterial property |
|---|---|---|---|---|---|---|---|---|---|
| | | Before raw water permeation (mg/m²) | After raw water permeation (mg/m²) | | Salt-blocking rate (%) | Permeation flux (m³/m²·d) | Salt-blocking rate (%) | Permeation flux (m³/m²·d) | |
| Example 6 | 91/9 | 130 | 66 | 51 | 99.6 | 0.8 | 99.6 | 0.8 | ○ |
| Example 7 | 91/9 | 130 | 121 | 93 | 99.6 | 0.8 | 99.6 | 0.8 | ○ |
| Example 8 | 91/9 | 130 | 124 | 95 | 99.6 | 0.8 | 99.6 | 0.8 | ○ |

The invention claimed is:

1. A composite semipermeable membrane comprising a skin layer formed on the surface of a porous support and containing a polyamide-based resin obtained by reacting a polyfunctional amine component with a polyfunctional acid halide component, wherein an antibacterial layer containing a silver-based antibacterial agent and a polymer component is formed on the skin layer directly or with other layer interposed therebetween, and the weight ratio between the silver-based antibacterial agent and the polymer component in the antibacterial layer is 80:20 to 95:5 (silver-based antibacterial agent:polymer component).

2. The composite semipermeable membrane according to claim 1, wherein the silver-based antibacterial agent is a supported material containing a silver ion.

3. The composite semipermeable membrane according to claim 1, wherein the silver-based antibacterial agent has an average particle diameter of 1.5 µm or less.

4. The composite semipermeable membrane according to claim 1, wherein the silver-based antibacterial agent is heat-treated at 700° C. or higher.

5. The composite semipermeable membrane according to claim 1, wherein the silver content in the antibacterial layer is 30 mg/m² or more.

6. The composite semipermeable membrane according to claim 1, wherein the polymer component is polyvinyl alcohol.

7. The composite semipermeable membrane according to claim 6, wherein the polyvinyl alcohol has a saponification degree of 99% or more.

8. The composite semipermeable membrane according to claim 6, wherein the polyvinyl alcohol has a saponification degree of 90% or more and is crosslinked to the polyamide-based resin in the skin layer.

9. A water treatment method using the composite semipermeable membrane as claimed in claim 1.

10. The composite semipermeable membrane according to claim 2, wherein the silver-based antibacterial agent has an average particle diameter of 1.5 µm or less.

11. The composite semipermeable membrane according to claim 2, wherein the silver-based antibacterial agent is heat-treated at 700° C. or higher.

12. The composite semipermeable membrane according to claim 1, wherein the silver-based antibacterial agent is selected from the group consisting of metal silver, silver oxide, silver halide, and a supported material containing a silver ion.

13. The composite semipermeable membrane according to claim 1, wherein the silver-based antibacterial agent is a supported material containing a silver ion, and wherein the supported material is selected from the group consisting of zeolite, silica gel, calcium phosphate, and zirconium phosphate.

14. The composite semipermeable membrane according to claim 1, wherein the thickness of the antibacterial layer is 0.05 to 5 µm.

* * * * *

UNITED STATES PATENT AND TRADEMARK OFFICE
CERTIFICATE OF CORRECTION

PATENT NO. : 8,672,142 B2
APPLICATION NO. : 12/668368
DATED : March 18, 2014
INVENTOR(S) : Nishiyama et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 698 days.

Signed and Sealed this
Twenty-ninth Day of September, 2015

Michelle K. Lee
*Director of the United States Patent and Trademark Office*